(12) United States Patent
Osborn (10) Patent No.: US 8,730,388 B2
(45) Date of Patent: May 20, 2014

(54) WEARABLE VIDEO CAMERA WITH DUAL ROTATABLE IMAGING DEVICES

(76) Inventor: Calvin Osborn, Ogden, UT (US)

(*) Notice: Subject to any disclaimer, the term of this patent is extended or adjusted under 35 U.S.C. 154(b) by 486 days.

(21) Appl. No.: 13/204,242

(22) Filed: Aug. 5, 2011

(65) Prior Publication Data

US 2013/0033610 A1 Feb. 7, 2013

(51) Int. Cl.
*H04N 5/225* (2006.01)

(52) U.S. Cl.
USPC .............. 348/375; 348/38; 348/47; 348/373; 348/376

(58) Field of Classification Search
USPC ............................. 348/38, 47, 373, 374, 376
See application file for complete search history.

(56) References Cited

U.S. PATENT DOCUMENTS

| | | | |
|---|---|---|---|
| 4,516,157 A | 5/1985 | Campbell | |
| 4,884,137 A | 11/1989 | Hanson et al. | |
| 5,479,098 A | 12/1995 | Yokoyama et al. | |
| 5,657,073 A * | 8/1997 | Henley | 348/38 |
| 5,886,739 A | 3/1999 | Winningstad | |
| 6,473,118 B1 * | 10/2002 | Morrow | 348/143 |
| 6,549,231 B1 | 4/2003 | Matsui | |
| 6,657,673 B2 | 12/2003 | Ishikawa | |
| 6,704,044 B1 | 3/2004 | Foster et al. | |
| 6,717,737 B1 | 4/2004 | Haglund | |
| 6,819,354 B1 | 11/2004 | Foster et al. | |
| 7,573,525 B2 | 8/2009 | Yamasaki | |
| 7,576,800 B2 | 8/2009 | Swain | |
| 7,786,424 B2 | 8/2010 | Durner et al. | |
| 8,253,777 B2 * | 8/2012 | Lin | 348/36 |
| 8,279,266 B2 * | 10/2012 | Theobald | 348/36 |
| 2004/0165109 A1 | 8/2004 | Lee | |
| 2005/0052537 A1 | 3/2005 | Mizusawa | |
| 2006/0055786 A1 | 3/2006 | Ollila | |
| 2008/0192114 A1 | 8/2008 | Pearson | |
| 2009/0109292 A1 | 4/2009 | Ennis | |
| 2010/0103267 A1 | 4/2010 | O'Rourke | |

FOREIGN PATENT DOCUMENTS

| | | |
|---|---|---|
| CN | 101093271 | 12/2007 |
| JP | 7014109 | 1/1995 |
| JP | 2005086522 | 3/2005 |
| JP | 2006148842 | 6/2006 |
| JP | 2006174416 | 6/2006 |
| WO | WO 9426061 | 11/1994 |
| WO | WO 2010/090473 | 8/2010 |

OTHER PUBLICATIONS

Prov.HD Digital Video Camera; http://www.vio-pov-.com/products-all/pov-hd.html; website printed Jul. 29, 2011.
HD Helmet Camera: 1080P Wearable Sports Cam; http://gopro.com/cameras/hd-helmet-hero-camera website printed Jul. 27, 2011.

* cited by examiner

*Primary Examiner* — Anthony J Daniels
(74) *Attorney, Agent, or Firm* — Thorpe North & Western LLP (57) ABSTRACT

A digital imaging device includes at least two image sensors carried by a body and having image axes oriented transverse to one another and facing in different directions transverse to one another. The image sensors are rotatable with respect to the body and each have a rotational axis parallel with a respective corresponding image axis. Each image sensor has an upright physical orientation corresponding to an upright orientation of the optical image and is capable of rotation about the rotational axis to orient the image sensor in the upright orientation.

17 Claims, 6 Drawing Sheets

WEARABLE VIDEO CAMERA WITH DUAL ROTATABLE IMAGING DEVICES

BACKGROUND

1. Field of the Invention

The present invention relates generally to digital video cameras. More particularly, the present invention relates to wearable or point-of-view (POV) digital cameras.

2. Related Art

Hands-free video recording and/or action videography/videotography can involve the use of a camera mounted on a user, such as a user's helmet and often referred to as a helmet cam. For example, see the GoPro HD helmet Hero digital camera. Such cameras can be bulky and awkward, and can require elaborate, bulky and awkward mounting hardware, as the entire camera is mounted to the helmet. In addition, such cameras may be limited in their mountability, e.g. only being mountable to a helmet. Other systems can use a remote camera or remote recorder. For example, see the V.I.O. POV.HD camera, and US Patent Publication Nos. 2008/0192114; 2009/0109292 and 2010/0103267. Such cameras can also be bulky and awkward to mount and use.

So called "spy" cameras have a digital camera build into a pair of conspicuous and unbelievable glasses.

SUMMARY OF THE INVENTION

It has been recognized that it would be advantageous to develop a wearable video camera that is simple and easy to use, light-weight, easily mountable and configurable, to capture memories, action shots, activities, etc.

The invention provides a digital imaging device including at least two image sensors carried by a body, and each capable of converting an optical image into an electrical signal. The at least two image sensors have image axes oriented transverse to one another and face in different directions transverse to one another. The at least two image sensors are rotatable with respect to the body and each has a rotational axis parallel with a respective corresponding image axis. Each image sensor has an upright physical orientation corresponding to an upright orientation of the optical image, and is capable of rotation about the rotational axis to orient the image sensor in the upright orientation.

In addition, the invention provides a digital image recording system including an elongated barrel defining a longitudinal axis. A longitudinal ferrule is rotatably disposed on an end of the barrel, and has a rotational axis parallel with the longitudinal axis of the barrel. A longitudinal image sensor is carried by the longitudinal ferrule at the end of the barrel, and has an image axis parallel with the rotational axis of the longitudinal ferrule and the longitudinal axis of the barrel. A lateral ferrule is rotatably disposed on a side of the barrel, and has a rotational axis transverse to the longitudinal axis of the barrel. A lateral image sensor is carried by the lateral ferrule on the side of the barrel, and has an image axis parallel with the rotational axis of the lateral ferrule and transverse to the longitudinal axis of the barrel. Each image sensor is capable of converting an optical image into an electrical signal. The system also includes attachment means for attaching a lateral attachment side of the barrel, opposite the lateral image sensor and the lateral ferrule, to a wearable article or accessory with the lateral attachment side facing the wearable article or accessory. Each image sensor has an upright physical orientation corresponding to an upright orientation of the optical image. Each ferrule, and thus each image sensor, is rotatable with respect to the barrel to orient each image sensor in the upright orientation. The barrel, the ferrules and the image sensors have a plurality of selectable configurations, including: 1) a left side mount with a) the lateral attachment side of the barrel facing a left side of the wearable article or accessory, b) the longitudinal image sensor and the longitudinal ferrule facing forwardly with respect to the wearable article or accessory, c) the lateral image sensor and the lateral ferrule facing left with respect to the wearable article or accessory, and d) the longitudinal and lateral image sensors oriented upright; 2) a right side mount with a) the lateral attachment side of the barrel facing a right side of the wearable article or accessory, b) the longitudinal image sensor and the longitudinal ferrule facing forwardly with respect to the wearable article or accessory, c) the lateral image sensor and the lateral ferrule facing right with respect to the wearable article or accessory, and d) the longitudinal and lateral image sensors oriented upright; 3) a top mount with a) the lateral attachment side of the barrel facing a top side of the wearable article or accessory, b) the longitudinal image sensor and the longitudinal ferrule facing forwardly with respect to the wearable article or accessory, c) the lateral image sensor and the lateral ferrule facing upward with respect to the wearable article or accessory, and d) the longitudinal image sensor oriented upright; and 4) a front mount with a) the lateral attachment side of the barrel facing a front of the wearable article or accessory, b) the longitudinal image sensor and the longitudinal ferrule facing left or right with respect to the wearable article or accessory, c) the lateral image sensor and the lateral ferrule facing forward with respect to the wearable article or accessory, and d) the longitudinal and lateral image sensors oriented upright. An image storage device is operatively coupled to the image sensors to save the electronic signal from at least one of the image sensors.

Furthermore, the invention provides a method for digital image recording, including: 1) obtaining a digital imaging device having at least two separate and discrete image sensors disposed in ferrules carried by an elongated barrel defining a longitudinal axis with a longitudinal image sensor and a longitudinal ferrule being rotatably disposed on an end of the barrel and having an image axis and a rotational axis parallel with the longitudinal axis, and a lateral image sensor and lateral ferrule disposed on a side of the barrel and having an image axis and a rotational axis transverse to the longitudinal axis, each image sensor being capable of converting an optical image into an electrical signal and having an upright physical orientation corresponding to an upright orientation of the optical image, and with a lateral attachment side of the barrel opposite the lateral image sensor and lateral ferrule; 2) securing the lateral attachment side of the barrel to a wearable article or accessory with the lateral attachment side facing the wearable article or accessory, and orienting the barrel, and thus the image axes of the image sensors, in a desired imaging direction; 3) rotating the longitudinal and lateral ferrules, and thus the longitudinal and lateral image sensors, with respect to the barrel, and thus the wearable article or accessory; 4) selecting one or both of the longitudinal and lateral image sensors for operation to produce at least one electronic signal; and 5) causing an image storage device operatively coupled to the image sensors to save the at least one electronic signal.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1d is a side view of the digital imaging device or camera of FIG. 1a;

FIG. 1e is a bottom view of the digital imaging device or camera of FIG. 1a;

FIG. 1f is a front view of the digital imaging device or camera of FIG. 1a;

FIG. 1g is a detailed cross-sectional view of the digital imaging device or camera of FIG. 1 taken along line 1g of FIG. 1e;

FIG. 4b is a schematic perspective view of the digital imaging device or camera of FIG. 4a;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "image sensor" is used broadly herein to refer to a device that converts an optical or visual image into an electrical signal. Such an image sensor can include, by way of example, a charge-coupled device (CCD) or a complementary metal-oxide-semiconductor (CMOS) active pixel sensor, or other semiconductor image chip.

The term "wearable article or accessory" is used broadly herein to refer to an article or accessory wearable by a user. Such an article or accessory can include headgear, or can be wearable on the user's head, including by way of example, a helmet, a hat, a headband, eyeglasses, sun glasses, goggles, a headphone, and an earpiece. Such headgear can provide a point of view (POV) as the headgear moves with the user's head. Such an article or accessory can also include clothing or a harness. Such a wearable article or accessory can have a front, a rear, a left side, a right side and a top; corresponding to a respective forward, rearward, left, right and upward point of view or direction with respect to the user.

DESCRIPTION

The present invention provides a digital imaging device or system capable of taking still or motion digital video images, and that is wearable by a user to capture point-of-view or action images in a hands-free manner, and that is easily attachable to the user or the user's clothing or accessories, and that is small and light weight. Thus, the digital imaging device can be used in many different activities, including by way of example, snowboarding, skiing, skate boarding, snowmobiling, mountain-biking, cross country cycling, climbing, golfing, horseback riding, ATVing, camping, fishing, amusement park rides, off-roading, camping, site-seeing, motorcycling, etc. The video recorded from these activities can be saved and viewed immediately, and relived later, and shared with friends and family. The present invention provides a digital imaging device with multiple image sensors oriented at different image directions to easily capture different views. In addition, the image sensors can be rotatable to facilitate mounting in different locations and orientations while allowing the image sensor(s) to be oriented upright. Furthermore, the image sensors can be rotated to obtain unique and interesting visual effects.

Figures 1A, 1B, 1C:
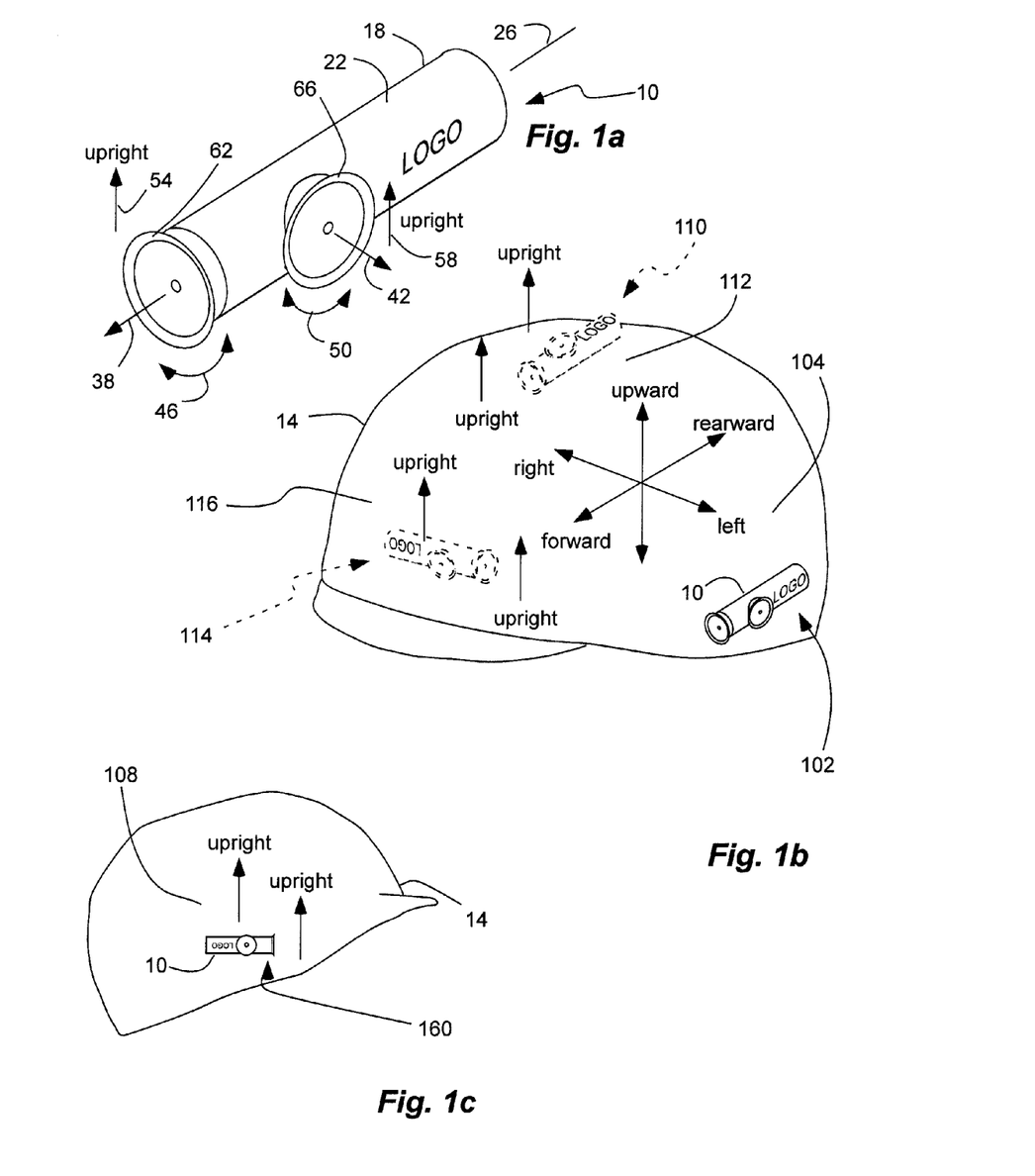
FIG. 1a is a perspective view of a digital imaging device or camera in accordance with an embodiment of the present invention.
FIG. 1b is a perspective view of the digital imaging device or camera of FIG. 1a shown disposed on a wearable article or accessory, namely a hat (showing a left side mount with the digital imaging device shown on a left side of the hat; but with top and front mounts shown in dashed lines.
FIG. 1c is a side view of the digital imaging device or camera of FIG. 1a shown disposed on the wearable article or accessory, namely the hat of FIG. 1b (showing a right side mount with the digital imaging device shown on a right hand side)
Figures 1D, 1E, 1F, 1G:
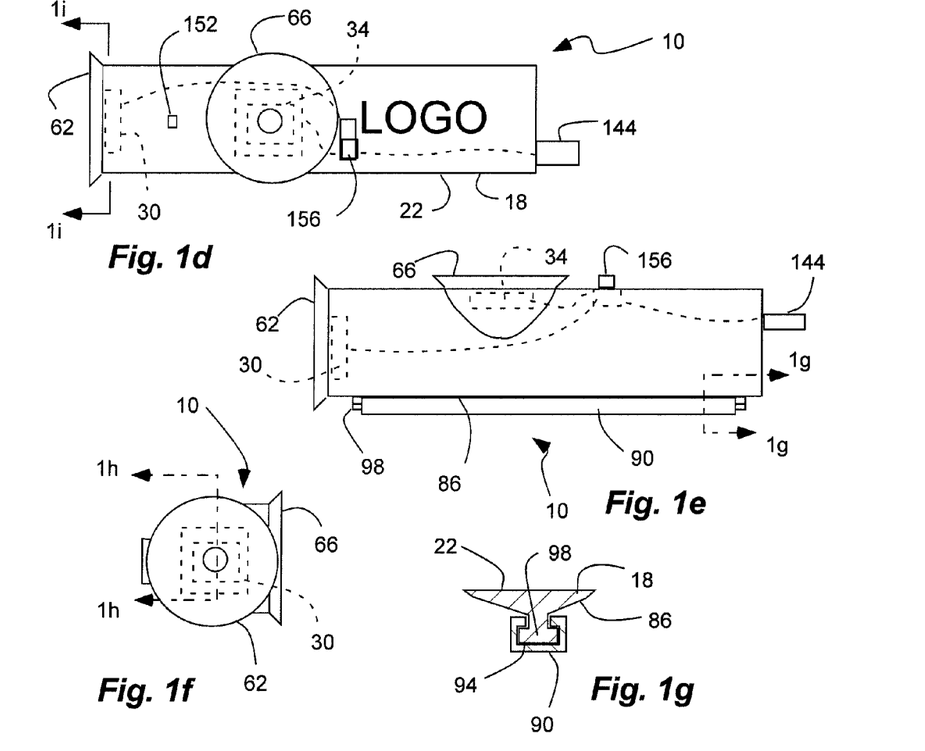
Figure 1H:
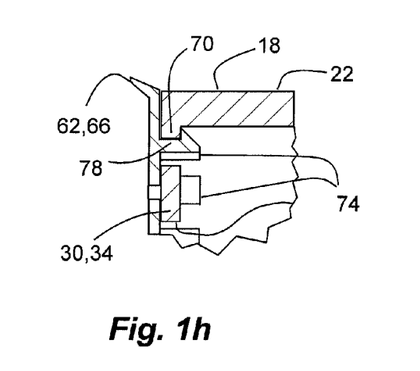
FIG. 1h is a detailed cross-sectional view of the digital imaging device or camera of FIG. 1a taken along line 1h of FIG. 1f.
Figure 1I:
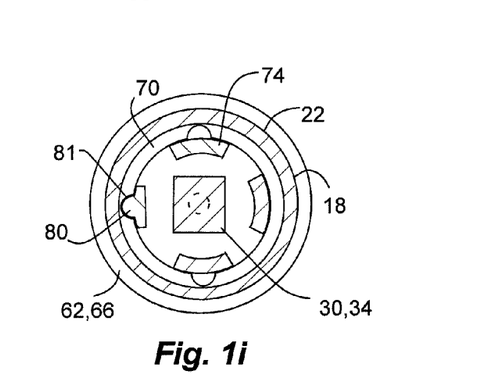
FIG. 1i is a cross-sectional view of the digital imaging device or camera of FIG. 1a taken along line 1i of FIG. 1d.
Figure 2:
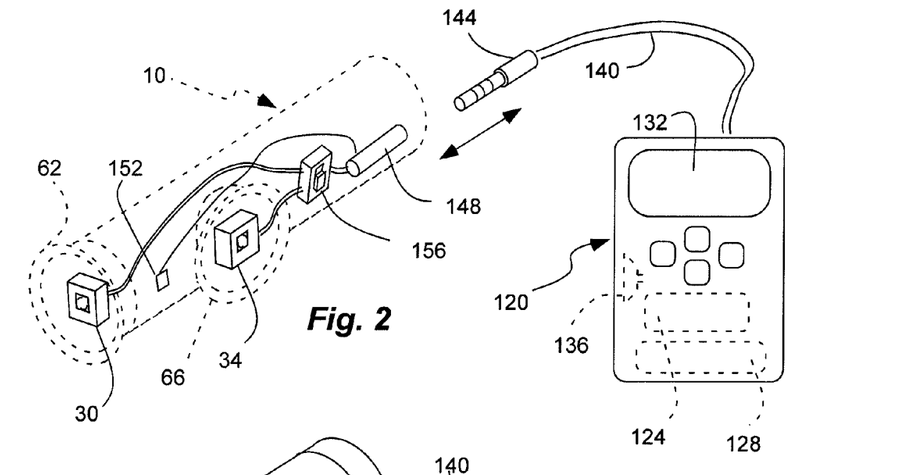
FIG. 2 is a schematic perspective view of the digital imaging device or camera of FIG. 1a shown with a wired digital video recorder and player system in accordance with an embodiment of the present invention.

As illustrated in FIGS. 1a-2, a digital imaging device, indicated generally at 10, in an example implementation in accordance with the invention is shown with a wearable article or accessory, namely a hat 14 for purposes of illustration. The device 10 can include a body 18 that can be secured to the wearable article or accessory. The body 18 can take the form of an elongated barrel 22 having or defining a longitudinal axis 26. The body or barrel can be cylindrical and annular and can be formed of plastic, such as by extrusion. Alternatively, the body or barrel can be formed of housing halves, such as by injection molding, and joined together, such as with adhesive or sonic welding. It will be appreciated that the body or barrel can have various different shapes, including cylindrical, rectangular block, etc.

At least two image sensors are carried by the body or barrel, each capable of converting an optical image into an electrical signal. Multiple image sensors allows the device to capture different images. The image sensors can include a longitudinal image sensor 30 disposed at a longitudinal end of the body or barrel, and a lateral image sensor 34 disposed at a lateral side of the body or barrel. Having multiple image sensors on different sides of the body or barrel allows the body or barrel to be conveniently disposed on the wearable article or accessory. Thus, the image sensors can have image axes (longitudinal 38 and lateral 42) oriented transverse to one another, and facing (also indicated by arrows 38 and 42) in different directions transverse to one another. Having transverse image sensors allowed the device to capture different images from different directions.

In addition, the at least two image sensors are rotatable (indicated by arrows 46 and 50) with respect to the body or barrel. Each image sensor has a rotational axis (also indicated by lines 38 and 42) parallel, or even concentric with, with a respective corresponding image axis 38 and 42. Thus, the image sensor can pivot or rotate about the image axis, or image direction. Each image sensor has an upright physical orientation (indicated by arrows 54 and 58) corresponding to an upright orientation of the optical image (and an upright orientation of the display device or screen). The rotation of the image sensors allows the image sensors to be capable of rotation about the rotational axis to orient the image sensor in the upright orientation, despite the orientation of the body or barrel.

The body or barrel can include ferrules to carry the image sensors and rotatably couple the image sensors to the body or barrel. A longitudinal ferrule 62 can be rotatably disposed on an end of the barrel 22, and can have a rotational axis (also represented by line 38) parallel with, or even concentric with, the longitudinal axis 26 of the barrel. The longitudinal image sensor 30 can be carried by the longitudinal ferrule 62 at the end of the barrel 22, and can have the image axis 38 parallel with the rotational axis 38 of the longitudinal ferrule and the longitudinal axis 22 of the barrel. A front end of the barrel can define an open front end, and the longitudinal ferrule can cover the open front end. A lateral ferrule 66 can be rotatably disposed on a side of the barrel 22, and can have a rotational axis (also represented by line 42) transverse to the longitudinal axis 22 of the barrel. The lateral image sensor 34 can be carried by the lateral ferrule 66 on the side of the barrel 22, and can have the image axis 42 parallel with the rotational axis of the lateral ferrule, and transverse to the longitudinal axis 22 of the barrel. The barrel can have a lateral tube or barrel extending from the side of the barrel with an opening therein covered by the lateral ferrule. The ferrules can be formed of plastic, such as by injection molding. The imaging sensors can be adhered to the inside of the ferrules, or can be held by a snap clip, or the like. Each ferrule can have an opening therein through which light can pass to impinge on the image sensor. The opening can form the aperture of a pin-hole camera. The opening can be formed by a bore through the ferrule. In addition, the opening can be covered by a transparent cover or lens (having optical power).

The ferrules can be rotatably connected to the barrel in any appropriate manner. For example, referring to FIG. 1*h*, the openings in the barrel 22 can include an annular flange 70 extending inwardly. The ferrule 62 or 66 can have one or more fingers 74 extending in through the opening an engaging the flange 70. Thus, the fingers can have an annular channel or groove 78 which receives the flange 70 so that the ferrule can rotate with respect to the barrel. A distal end of the fingers can have an inclined tab and a larger diameter, such that the fingers can be press-fit into the opening in the barrel with the incline surface forcing the fingers inwardly and then snapping out as the barrel encounters the channel or grove to retain the ferrule in the opening. Alternatively, it will be appreciated that annular flange can extend outwardly and the fingers can face inwardly, rather than outwardly as shown, and that the channel or groove can face outwardly, rather than inwardly as shown, so that the ferrule engages the outside of the barrel, rather than the inside of the opening. Alternatively, it will be appreciated that the fingers can be formed on the barrel and can insert into an annular opening in the ferrule, opposite that shown. Alternatively, it will be appreciated that outer fingers can be formed on the barrel to engage an outwardly facing channel or groove on the ferrule. Alternatively, it will be appreciated that the flexible fingers can be done away with by having two halves of the housing enclosed around the channel or groove of the ferrule.

The ferrules can have an outer diameter greater than an outer diameter or size of the body or barrel to facilitate rotation of the ferrules. Alternatively, the ferrules can have the same diameter of the barrel, and may be flush therewith, to facilitate mounting. The ferrules can include outer rubs or knurling to facilitate a frictional grip with the user's fingers.

The image sensors can be rotatable with respect to the body or barrel through at least 180 degrees. Electrical connection to the image sensors can be made by a length or loop of wire or wire ribbon with enough slack to allow the image sensor to rotate by the flexibility of the wire or wire ribbon. In addition, the image sensors, and/or ferrules, can be selectively and releasably lockable, or biased at 0, 90 and 180 degree selectable increments, such as up, down and sideways. The ferrules can be releasable lockable with a simple detent mechanism, such as a small protrusion 80 receivable in a small indentation 81 anywhere between the interface of the ferrule and body or barrel, as shown in FIG. 1*i*.

The body or barrel can have an outer side 82, defined by the lateral ferrule and/or lateral image sensor, and an inner side or attachment side 86 attached to the wearable article or accessory. For example, referring to FIGS. 1*e* and 1*g*, an elongated bracket 90, attachable to the wearable article or accessory, can include a T-slot 94, and a T-rail 98, extendible from the barrel, and slideably receivable in the T-slot. The bracket 90 can affix to the wearable article or accessory in any appropriate manner, including by way of example, adhesive, screws, bolt and nut, flexible straps or ties, hook-and-look type fasteners, rubber sleeves, etc. The T-rail can have a T-shape and can be formed with the barrel. Alternatively, the bracket can be formed with the barrel, and the T-rail can be affixed to the wearable article or accessory. The bracket and T-rail is one example of an attachment means for attaching a lateral attachment side of the barrel opposite the lateral image sensor and the lateral ferrule to a wearable article or accessory with the lateral attachment side facing the wearable article or accessory. Other attachment means can include, for example, adhesive, hook-and-loop type fastener, etc. It will be appreciated that the bracket 90 and T-rail 98 mounting, as well as other attachment means, can allow the body or barrel orientation to be reversed to obtain rear images.

The body or barrel and the image sensors can have a plurality of selectable configurations, including: a left side mount, a right side mount, a top mount and a front mount. The left side mount, indicated at 102 in FIG. 1*b*, includes: 1) the lateral attachment side 86 of the body or barrel facing a left side 104 of the wearable article or accessory 14; 2) one image sensor, such as the longitudinal image sensor 30 and longitudinal ferrule 62, facing forwardly with respect to the wearable article or accessory; 3) another image sensor, such as lateral image sensor 34 and lateral ferrule 66, facing left with respect to the wearable article or accessory; and 4) the image sensors 30 and 34 oriented upright, indicated by 54 and 58. Thus the device 10 is capable of a left side mounting with both image sensors upright. It will be appreciated that the image sensors and ferrules can be rotated away from upright to obtain interesting or unique visual effects.

The right side mount, indicated at 106 in FIG. 1*c*, includes: 1) the lateral attachment side 86 of the body or barrel facing a right side 108 of the wearable article or accessory 14; 2) one image sensor, such as the longitudinal image sensor 40 and the longitudinal ferrule 62, facing forwardly with respect to the wearable article or accessory; 3) another image sensor, such as the lateral image sensor 34 and the lateral ferrule 66, facing right with respect to the wearable article or accessory; and 4) the image sensors 30 and 34 oriented upright, indicated by 54 and 58. In the right side mount, it will be noted that the body or barrel is oriented upside down, or 180 degrees, with respect to the left side mount; but the image sensors and ferrules are oriented upright, and rotated 180 degrees with respect to the left side mount, to take or record an upright image. In addition, it will be appreciated that the image sensors and ferrules can be rotated away from upright to obtain interesting or unique visual effects.

The top mount, indicated by 110 in FIG. 1*b*, includes: 1) the lateral attachment side 86 of the body or barrel facing a top side 112 of the wearable article or accessory 14; 2) one sensor, such as the longitudinal image sensor 30 and longitudinal ferrule 60, facing forwardly with respect to the wearable article or accessory; 3) another image sensor, such as the lateral image sensor 34 and lateral ferrule 66, facing upward with respect to the wearable article or accessory. The longitudinal image sensor 30 can be oriented upright. In the top mount, it will be noted that the body or barrel is oriented sideways, or 90 degrees, with respect to the left and right side mount; but the longitudinal image sensor and ferrule are oriented upright, and oriented 90 degrees with respect to the left and right side mounts, to take or record an upright image. In addition, it will be appreciated that the image sensors and ferrules can be rotated away from upright to obtain interesting or unique visual effects.

The front mount, indicated by 114 in FIG. 1*b*, includes: 1) the lateral attachment side 86 of the body or barrel facing a front 116 of the wearable article or accessory 14; 2) one image sensor, such as the longitudinal image sensor 30 and lateral ferrule 60, facing left (shown) or right (opposite that shown) with respect to the wearable article or accessory; 3) another image sensor, such as the lateral image sensor 34 and the lateral ferrule 66, facing forward with respect to the wearable article or accessory; and 4) the image sensors 30 and 34 oriented upright, indicated by 54 and 58. In the front mount, it will be noted that the body or barrel is oriented transverse, or 90 degrees, with respect to the left and right side mount, and the top mount; but the image sensors and ferrules are oriented upright to take or record an upright image. In addition, it will be appreciated that the image sensors and ferrules can be rotated away from upright to obtain interesting or unique visual effects.

Therefore, the device can be mounted in various different locations on the wearable article or accessory, but still have the image sensors oriented upright and capable of recording an upright image. It will be appreciated that the wearable article or accessory can include various different articles of clothing or accessories, including by way of example, a helmet, a hat, a headband, eyeglasses or sun glasses (FIG. 5), goggles, a headphone (FIG. 6), an earpiece, an article of clothing or a harness. In addition, it will be appreciated that the device, or body or barrel, can be located in other locations, such as on the rear side or even the underside of the wearable article or accessory. The bracket 90 and T-rail 98, or other attachment means, can be disposed between the attachment side 86 and the wearable article or accessory in each case. The device can be small and easy to mount. In one aspect, the body or barrel and the two image sensors can form a discrete unit having a weight less than 2 ounces, a length less than 3 inches, and a diameter less than ½ inch. In another aspect, the body or barrel and the two image sensors can form a discrete unit having a weight less than 1.5 ounces, a length less than 2.5 inches, and a diameter less than ⅜ inch.

The camera device 10 can also include or be combined with an image storage device. The image storage device can save the electronic signal from the image sensor or sensors, and can be, for example, a flash drive, a hard drive, a removable flash memory card, etc. The image storage device can be operatively coupled to the image sensors, such as by the electronic wire or wire ribbon, electrical circuit board(s), etc. The image storage device can be integral with the device, or body or barrel, or can be remote from the device, or body or barrel. For example, the image storage device can be, or can be included in, a separate and discrete digital video recorder and player system, indicated at 120 in FIG. 2. Such a system can have an image storage device 124, a power source 128, such as a battery, a display screen 132, such as a LCD or touch screen, and a speaker 136 or other sound transducer. The system can also include button or touch screen for control of the system, and/or control of the camera device or image sensors. The system 120 can be remote from the camera device 10, and they can be coupled together with an audio/video (AV) cord 140. The AV cord can have a male 3.5 mm mini AV jack 144 disposed on one end, and can have a similar jack coupled to to opposite end couplable to the system. The jack 144 can be couplable to a female 3.5 mm mini AV jack 148 disposed in the body or barrel of the digital imaging device. The AV cord 140 can provide power from the power source 128 of the digital video recorder and player 120 to the image sensors 30 and 34 of the digital imaging device 10. In addition, the AV cord can provide the electrical signal corresponding to the optical image from the image sensor(s) to the image storage device 124 and/or display screen 132 of the digital video recorder and player 120. Furthermore, the AV cord can provide an electrical signal from a microphone transducer 152 carried by the body or barrel to the image storage device 124 and/or speaker 136. The screen 132 and/or speaker 136 can play image and/or sound directly from the camera device in real time, or as recorded from the image storage device 124. In addition, the digital video recorder and player system can include or can be a controller for the image sensors, and can provide functions or controls, such as zoom (in and out), record, pause, etc.

The device 10 can include a selector switch 156 to operate just one of the image sensors. Thus, the switch can determine which electrical signal from which image sensor is operatively coupled to the image storage device. For example, the switch can have a front or longitudinal selection to select the longitudinal image sensor, and a side, middle or lateral section to select the lateral image sensor. Alternatively, both image sensors can operate at the same time and the image storage device can capture or record both images. Alternatively, the switching function can be accomplished by voice activation utilizing a microphone and associated electronics disposed in the body or barrel.

Figures 3A, 3B:
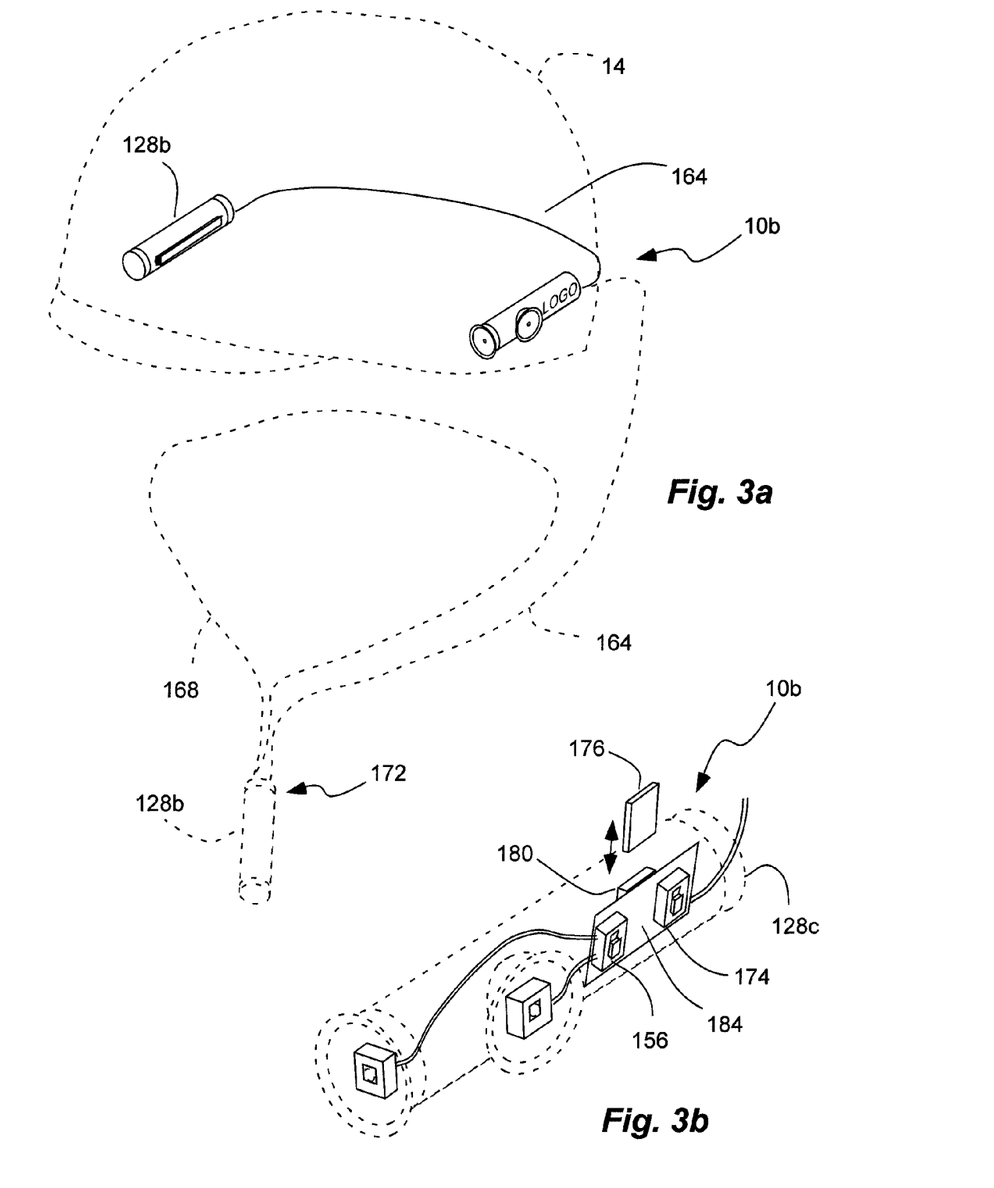
FIG. 3a is a schematic perspective view of a digital imaging device or camera shown with an external power source shown disposed on the hat (or with a lanyard in dashed lines) in accordance with an embodiment of the present invention.
FIG. 3b is a schematic perspective view of a digital imaging device or camera shown with an internal power source and removable memory device in accordance with an embodiment of the present invention.

As discussed above, the image storage device can be internal to the camera device. In addition, the power source or batteries can be internal to the camera device, or remote from the camera device. Referring to FIGS. 3*a* and 3*b*, another camera device 10*b* is shown that is similar in many respects to that described above, and which description is herein incorporated by reference. The device 10*b* can have a remote or external battery compartment or power source 128*b*. The battery compartment 128*b* can be mounted to the wearable article or accessory, shown at 160, in a similar manner as the camera device. For example, the battery compartment 128*b* can be mounted 160 opposite the body or barrel of the camera device, and connected by a wire 164. Alternatively, the battery compartment 128*b* can be hung by a lanyard 168 from the user's neck, indicated at 172 in FIG. 3*a*. Alternatively, the battery or power source 128c can be an internal power source carried by or disposed in the body or barrel, as shown in FIG. 3b. The device 10b can include a power switch 174 to operate the device 10b and/or image sensors.

In addition, the device 10b can include or be combined with a flash memory card 176. The flash memory card 176 can be removably disposed in a port 180 in the body or barrel capable of physically and electronically received the flash memory card. In addition, the port can operatively couple the flash memory card to the control electronics 184. The control electronics can be carried by or disposed in the body or barrel, and can be coupled to the image sensors to convert the electrical signal corresponding to the optical image from at least one of the image sensors into an image format.

Figure 4A:
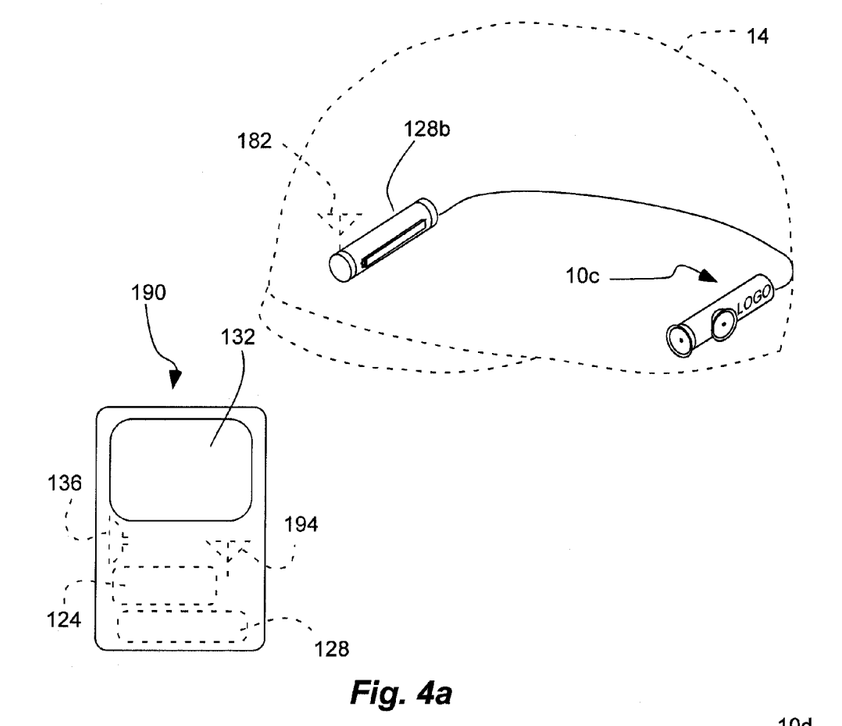
FIG. 4a is a schematic perspective view of a digital imaging device or camera shown with a wireless digital video recorder and player system and on the hat in accordance with an embodiment of the present invention.
Figure 4B:
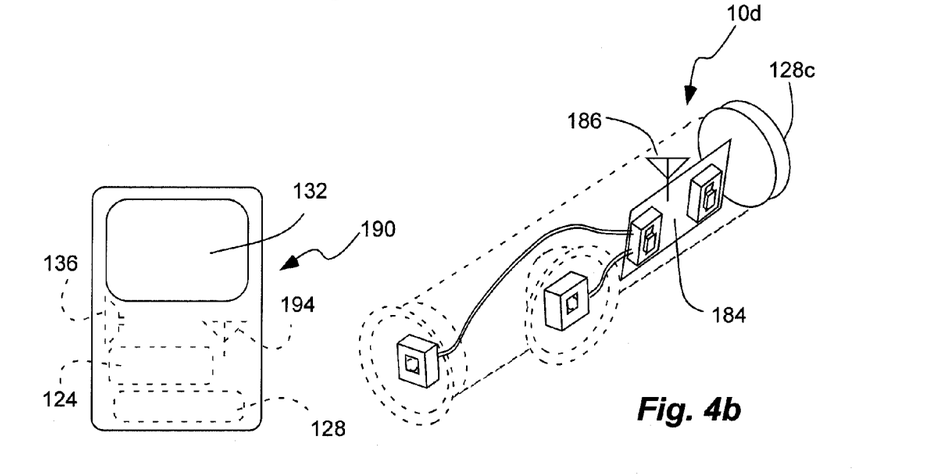

As discussed above, the image storage device can be remote from the camera device, but wired thereto, or operatively coupled by an electrical wire. In addition, the image storage device can be remote and wireless with respect to the camera device. Referring to FIGS. 4a and 4b, other camera devices 10c and 10d are shown that are similar in many respects to those described above, and which descriptions are herein incorporated by reference. The device 10c or 10d can include a wireless transmitter or transceiver 182 or 186 carried by the battery compartment 128b (as shown in FIG. 4a) or carried by or disposed in the body or housing (as shown in FIG. 4b), and capable of transmitting the electrical signal from at least one of the image sensors. The device 10c or 10d can include or can be combined with a separate and discrete wireless electronic device 190 capable of recording and playing digital video. The wireless electronic device 190 can be similar to the digital video recorder and player system 120 described above, and can have an image storage device 124, a power source 128, a display screen 132 and a speaker 136. In addition, the wireless electronic device 190 can have a wireless receiver or transceiver 194 carried by the wireless electronic device and capable of receiving the electrical signal from the body. The wireless electronic device 190 can be a cellular phone that can then further transmit the electrical signal. In addition, the images or videos can be sent to social networking or photo sharing sites on the internet, including for example, YouTube™, Facebook®, Picasa®, Flickr®, etc. The wireless electronic device can be a mobile computing device, or so called "smart phone," with one or more associated software programs, or so called "apps" or applications, that allow the mobile computing device to record the digital still or video images and associated audio using the digital image device as a remote camera. In addition, the mobile computing device and/or applications can include or can be a controller for the image sensors, and can provide functions or controls, such as zoom (in and out), record, pause, etc. The wireless transceivers can utilize formats or standards such as Bluetooth® short range wireless connectivity standard.

Figure 5:
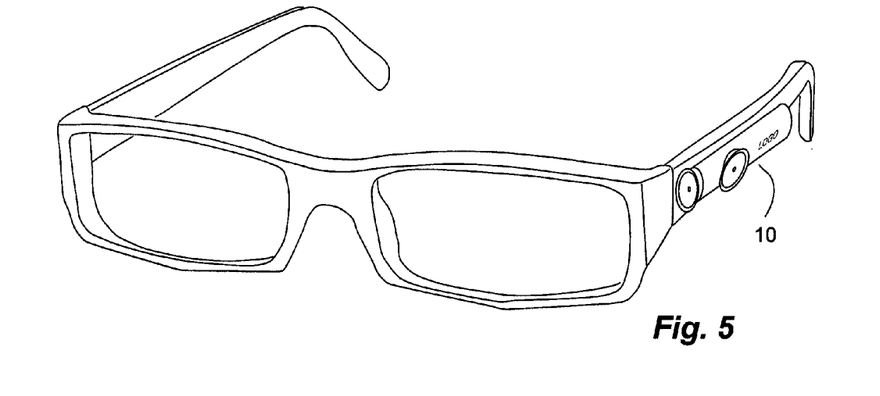
FIG. 5 is a perspective view of the digital imaging device or camera of FIG. 1a shown disposed on a wearable article or accessory, namely glasses.
Figure 6:
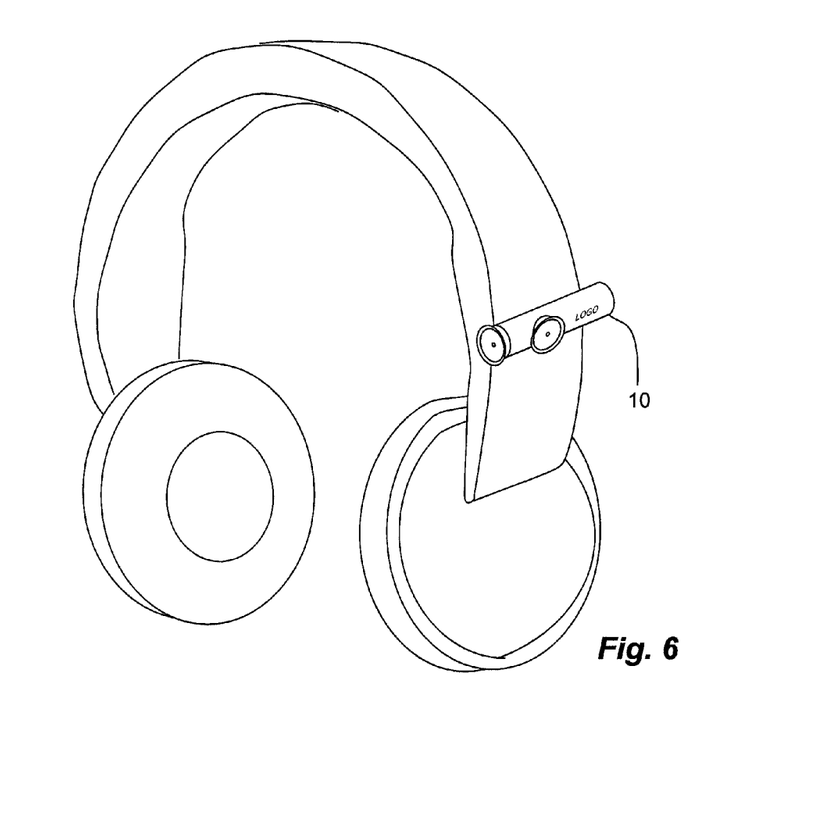
FIG. 6 is a perspective view of the digital imaging device or camera of FIG. 1a shown disposed on a wearable article or accessory, namely headphones.

Referring to FIG. 5, the digital imaging device or camera device described above can be mounted to eyeglasses or sunglasses. The bracket 90 can be secured to the earpiece of the glasses. Referring to FIG. 6, the digital imaging device or camera device described above can be mounted to headphones. The bracket 90 can be secured to the headband of the headphones.

Figures 7, 8:
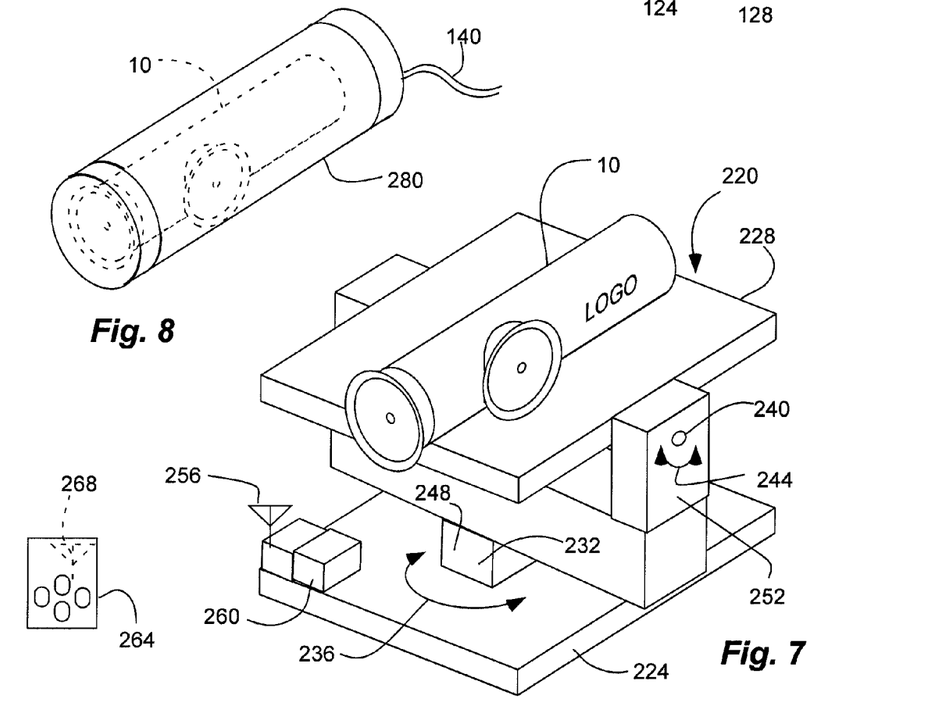
FIG. 7 is a perspective view of the digital imaging device or camera of FIG. 1a shown disposed on a remote controllable base.
FIG. 8 is a perspective view of the digital imaging device or camera of FIG. 1a shown disposed in a hand held container.

Referring to FIG. 7, the digital imaging device or camera device described above can be combined with a remote controllable base 220. The base 220 can include a base 224, such as a tripod or the like, fixed with respect to ground. A platform 228 can receive the camera device and can be carried by the base and pivotal with respect to the base in at least one degree of freedom and about at least one a pivot axle. For example, the pivot axle can be vertical axle 232 to that the camera can pivot left and right, indicated at 236. As another axle, the pivot axle can be horizontal axis 240 so that the camera can pivot up and down, indicated at 244. The platforms or axles can be motorized, and can include a vertical motor 248 and/or a horizontal motor 252, to pivot the platform. A receiver 256 can be operatively coupled to the motor(s). A power source 260 can be coupled to the motor(s) and the receiver. A remote control 264 can include a transmitter 268 to control the base. Alternatively, the receiver can be a sensor and the remote can be an object or transmitter that the sensor can sense and operate the base to follow the remote or transmitter.

Referring to FIG. 8, the digital image device or camera 10 is shown disposed in a hand-held container 280. The container 280 can be sized and shaped to more comfortably fit in a user's hand. The container 280 can have at least a transparent end or window in order to allow the longitudinal image sensor 30 to receive light. In addition, a perimeter wall of the container can be transparent in order to allow the lateral image sensor 34 to receive light.

It will be appreciated that the digital image storage devices and associated electronics can store and/or convert the electrical signals from the image sensors in any appropriate way and with any appropriate file standard and/or compression, including RAW, JPEG, TIFF, etc.

A method for using the digital image device or system above, and for digital image recording, includes obtaining a digital imaging device as described above. The lateral attachment side of the barrel is secured to the wearable article or accessory with the lateral attachment side facing the wearable article or accessory, and orienting the barrel, and thus the image axes of the image sensors, in a desired imaging direction. The longitudinal and lateral ferrules, and thus the longitudinal and lateral image sensors, are rotated with respect to the barrel, and thus the wearable article or accessory, to obtain an upright or other image. One or both of the longitudinal and lateral image sensors is selected for operation to produce at least one electronic signal. The image storage device is caused to be operatively coupled to the image sensors to save the at least one electronic signal. As described above, securing and orienting the barrel, and rotating the ferrules, can include selecting a selectable configuration including: a left side mount, a right side mount, a top mount and a front mount.

In one aspect, the digital imaging device can be coupled to the image storage device with an AV cord having a 3.5 mm mini AV jack coupled between the barrel and the AV cord. In another aspect, the electrical signal from at least one image sensor can be caused to be saved on a flash memory card carried by the barrel. In addition, an internal or external power source can be operatively coupled to the image sensors. In another aspect, the electrical signal from at least one image sensor can be caused to be transmitted wirelessly from the image sensors to a wireless electronic device. Again, an internal or external power source can be operatively coupled to the image sensors.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:
1. A digital imaging device, comprising:
 a) a body;

b) at least two image sensors carried by the body and each capable of converting an optical image into an electrical signal;
c) the at least two image sensors having image axes oriented transverse to one another and facing in different directions transverse to one another;
d) the at least two image sensors being rotatable with respect to the body and each having a rotational axis parallel with a respective corresponding image axis; and
e) each image sensor having an upright physical orientation corresponding to an upright orientation of the optical image and being capable of rotation about the rotational axis to orient the image sensor in the upright orientation, wherein the body and the at least two image sensors have a plurality of selectable configurations, including:
a) a left side mount with i) a lateral attachment side of the body facing a left side of the wearable article or accessory, ii) one image sensor facing forwardly with respect to the wearable article or accessory, iii) another image sensor facing left with respect to the wearable article or accessory; and iv) the image sensors oriented upright;
b) a right side mount with i) the lateral attachment side of the body facing a right side of the wearable article or accessory, ii) one image sensor facing forwardly with respect to the wearable article or accessory, iii) another image sensor facing right with respect to the wearable article or accessory; and iv) the image sensors oriented upright;
c) a top mount with i) the lateral attachment side of the body facing a top side of the wearable article or accessory, ii) one sensor facing forwardly with respect to the wearable article or accessory, iii) another image sensor facing upward with respect to the wearable article or accessory; and
d) a front mount with i) the lateral attachment side of the body facing a front of the wearable article or accessory, ii) one image sensor facing left or right with respect to the wearable article or accessory, iii) another image sensor facing forward with respect to the wearable article or accessory; and iv) the image sensors oriented upright.

2. A device in accordance with claim 1, wherein the body includes a barrel with a longitudinal axis, and further comprising:
a) a longitudinal ferrule rotatably disposed on an end of the barrel and having a rotational axis parallel with the longitudinal axis of the barrel;
b) one of the at least two image sensors being a longitudinal image sensor carried by the longitudinal ferrule at the end of the barrel and having the image axis parallel with the rotational axis of the longitudinal ferrule and the longitudinal axis of the barrel;
c) a lateral ferrule rotatably disposed on a side of the barrel and having a rotational axis transverse to the longitudinal axis of the barrel; and
d) another of the at least two image sensors being a lateral image sensor carried by the lateral ferrule on the side of the barrel and having an image axis parallel with the rotational axis of the lateral ferrule and transverse to the longitudinal axis of the barrel.

3. A device in accordance with claim 2, further comprising: attachment means for attaching a lateral attachment side of the barrel opposite the lateral image sensor and the lateral ferrule to a wearable article or accessory with the lateral attachment side facing the wearable article or accessory.

4. A device in accordance with claim 3, wherein the attachment means further comprises:
an elongated bracket with a T-slot and a t-rail slideably receivable in the T-slot, with one of the bracket and the T-rail affixed to the wearable article or accessory, and another of the bracket and the T-rail affixed to the barrel.

5. A device in accordance with claim 1, wherein the at least two image sensors are rotatable with respect to the body through at least 180 degrees; and wherein the at least two image sensors are selectively and releasably lockable at 0, 90 and 180 degree selectable increments.

6. A device in accordance with claim 1, further in combination with a wearable article or accessory, including a helmet, a hat, a headband, eyeglasses, sun glasses, goggles, a headphone, an earpiece, an article of clothing or a harness.

7. A device in accordance with claim 1, wherein the body and the at least two image sensors form a discrete unit having a weight less than 2 ounces, a length less than 3 inches, and a diameter less than ½ inch.

8. A device in accordance with claim 1, further in combination with a separate and discrete digital video recorder and player system having an image storage device, a power source, a display screen and a speaker, and further comprising:
a) a female 3.5 mm mini AV jack disposed in the body of the digital imaging device;
b) an AV cord with a male 3.5 mm mini AV jack disposed on one end couplable to the digital imaging device and an opposite end couplable to the digital video recorder and player; and
c) the AV cord providing power from the power source of the digital video recorder and player to the image sensors of the digital imaging device, and providing the electrical signal corresponding to the optical image from at least one of the image sensors to the image storage device or display screen of the digital video recorder and player, and providing an electrical signal from a microphone transducer carried by the body to the image storage device or speaker.

9. A device in accordance with claim 1, further in combination with a flash memory card; and wherein the digital imaging device further comprises:
a) an internal or external power source operatively coupled to the image sensors;
b) control electronics carried by the body and coupled to the image sensors to convert the electrical signal corresponding to the optical image from at least one of the image sensors into an image format;
c) a port in the body capable of physically and electronically received the flash memory card to operatively couple the flash memory card to the control electronics.

10. A device in accordance with claim 1, further in combination with a separate and discrete wireless electronic device capable of recording and playing digital video having an image storage device, a power source, a display screen and a speaker, and further comprising:
a) a wireless transceiver carried by the body and capable of transmitting the electrical signal from at least one of the image sensors;
b) an internal or external power source operatively coupled to the image sensors; and
c) a wireless transceiver carried by the wireless electronic device capable of receiving the electrical signal from the body.

11. A device in accordance with claim 1, further comprising:
a selector switch carried by the body and operatively coupled to the at least two image sensors to select one of the at least two image sensors for operation.

12. A digital image recording system, comprising:
a) an elongated barrel defining a longitudinal axis;
b) a longitudinal ferrule being rotatably disposed on an end of the barrel and having a rotational axis parallel with the longitudinal axis of the barrel;
c) a longitudinal image sensor carried by the longitudinal ferrule at the end of the barrel and having an image axis parallel with the rotational axis of the longitudinal ferrule and the longitudinal axis of the barrel;
d) a lateral ferrule rotatably disposed on a side of the barrel and having a rotational axis transverse to the longitudinal axis of the barrel;
e) a lateral image sensor carried by the lateral ferrule on the side of the barrel and having an image axis parallel with the rotational axis of the lateral ferrule and transverse to the longitudinal axis of the barrel;
f) each image sensor being capable of converting an optical image into an electrical signal;
g) attachment means for attaching a lateral attachment side of the barrel opposite the lateral image sensor and the lateral ferrule to a wearable article or accessory with the lateral attachment side facing the wearable article or accessory;
h) each image sensor having an upright physical orientation corresponding to an upright orientation of the optical image;
i) each ferrule, and thus each image sensor, being rotatable with respect to the barrel to orient each image sensor in the upright orientation;
j) the barrel, the ferrules and the image sensors having a plurality of selectable configurations, including:
   i) a left side mount with a) the lateral attachment side of the barrel facing a left side of the wearable article or accessory, b) the longitudinal image sensor and the longitudinal ferrule facing forwardly with respect to the wearable article or accessory, c) the lateral image sensor and the lateral ferrule facing left with respect to the wearable article or accessory; and d) the longitudinal and lateral image sensors oriented upright;
   ii) a right side mount with a) the lateral attachment side of the barrel facing a right side of the wearable article or accessory, b) the longitudinal image sensor and the longitudinal ferrule facing forwardly with respect to the wearable article or accessory, c) the lateral image sensor and the lateral ferrule facing right with respect to the wearable article or accessory; and d) the longitudinal and lateral image sensors oriented upright;
   iii) a top mount with a) the lateral attachment side of the barrel facing a top side of the wearable article or accessory, b) the longitudinal image sensor and the longitudinal ferrule facing forwardly with respect to the wearable article or accessory, c) the lateral image sensor and the lateral ferrule facing upward with respect to the wearable article or accessory; and d) the longitudinal image sensor oriented upright; and
   iv) a front mount with a) the lateral attachment side of the barrel facing a front of the wearable article or accessory, b) the longitudinal image sensor and the longitudinal ferrule facing left or right with respect to the wearable article or accessory, c) the lateral image sensor and the lateral ferrule facing forward with respect to the wearable article or accessory; and d) the longitudinal and lateral image sensors oriented upright; and
k) an image storage device operatively coupled to the image sensors to save the electronic signal from at least one of the image sensors.

13. A method for digital image recording, comprising:
a) obtaining a digital imaging device having at least two separate and discrete image sensors disposed in ferrules carried by an elongated barrel defining a longitudinal axis with a longitudinal image sensor and a longitudinal ferrule being rotatably disposed on an end of the barrel and having an image axis and a rotational axis parallel with the longitudinal axis, and a lateral image sensor and lateral ferrule disposed on a side of the barrel and having an image axis and a rotational axis transverse to the longitudinal axis, each image sensor being capable of converting an optical image into an electrical signal and having an upright physical orientation corresponding to an upright orientation of the optical image, and with a lateral attachment side of the barrel opposite the lateral image sensor and lateral ferrule;
b) securing the lateral attachment side of the barrel to a wearable article or accessory with the lateral attachment side facing the wearable article or accessory, and orienting the barrel, and thus the image axes of the image sensors, in a desired imaging direction;
c) rotating the longitudinal and lateral ferrules, and thus the longitudinal and lateral image sensors, with respect to the barrel, and thus the wearable article or accessory;
d) selecting one or both of the longitudinal and lateral image sensors for operation to produce at least one electronic signal; and
e) causing an image storage device operatively coupled to the image sensors to save the at least one electronic signal,
wherein securing and orienting the barrel, and rotating the ferrules, further comprises selecting a selectable configuration of:
a) left side mount with i) the lateral attachment side of the barrel facing a left side of the wearable article or accessory, ii) the longitudinal image sensor and the longitudinal ferrule facing forwardly with respect to the wearable article or accessory, iii) the lateral image sensor and the lateral ferrule facing left with respect to the wearable article or accessory; and iv) the longitudinal and lateral image sensors oriented upright;
b) right side mount with i) the lateral attachment side of the barrel facing a right side of the wearable article or accessory, ii) the longitudinal image sensor and the longitudinal ferrule facing forwardly with respect to the wearable article or accessory, iii) the lateral image sensor and the lateral ferrule facing right with respect to the wearable article or accessory; and iv) the longitudinal and lateral image sensors oriented upright;
c) top mount with i) the lateral attachment side of the barrel facing a top side of the wearable article or accessory, ii) the longitudinal image sensor and the longitudinal ferrule facing forwardly with respect to the wearable article or accessory, iii) the lateral image sensor and the lateral ferrule facing upward with respect to the wearable article or accessory; and iv) the longitudinal image sensor oriented upright; and
d) front mount with i) the lateral attachment side of the barrel facing a front of the wearable article or accessory, ii) the longitudinal image sensor and the longitudinal ferrule facing left or right with respect to the wearable article or accessory, iii) the lateral image sensor and the lateral ferrule facing forward with respect to the wearable article or accessory; and iv) the longitudinal and lateral image sensors oriented upright.

14. A method in accordance with claim 13, further comprising:

coupling the digital imaging device to the image storage device with an AV cord having a 3.5 mm mini AV jack coupling between the barrel and the AV cord; and wherein the image storage device provides power from a power source to the image sensors.

15. A method in accordance with claim 13, causing the image storage device to save the at least one electronic signal further comprises:
causing the electrical signal from at least one image sensor to be saved on a flash memory card carried by the barrel; and
further comprising:
operatively coupling an internal or external power source to the image sensors.

16. A method in accordance with claim 13, causing the image storage device to save the at least one electronic signal further comprises:
causing the electrical signal from at least one image sensor to be transmitted wirelessly from the image sensors to a wireless electronic device; and
further comprising:
operatively coupling an internal or external power source to the image sensors.

17. A method in accordance with claim 16, wherein the wireless electronic device is a cellular phone; and further comprising:
causing the cellular phone to transmit the electrical signal.

* * * * *